(12) United States Patent
Taherian et al.

(10) Patent No.: US 9,182,509 B2
(45) Date of Patent: Nov. 10, 2015

(54) SYSTEM AND METHOD FOR GENERATING TRUE DEPTH SEISMIC SURVEYS

(75) Inventors: Reza Taherian, Sugar Land, TX (US); Jacques R. Tabanou, Houston, TX (US); Eric Tabanou, legal representative, Houston, TX (US); Emmanuel Legendre, Sevres (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 370 days.

(21) Appl. No.: 13/002,682

(22) PCT Filed: Jul. 8, 2009

(86) PCT No.: PCT/US2009/049941
§ 371 (c)(1),
(2), (4) Date: Mar. 23, 2011

(87) PCT Pub. No.: WO2010/006052
PCT Pub. Date: Jan. 14, 2010

(65) Prior Publication Data
US 2011/0305110 A1 Dec. 15, 2011

Related U.S. Application Data

(60) Provisional application No. 61/079,681, filed on Jul. 10, 2008.

(51) Int. Cl.
*G01V 1/28* (2006.01)
*G01V 1/48* (2006.01)

(52) U.S. Cl.
CPC ........ *G01V 1/282* (2013.01); *G01V 1/48* (2013.01); *G01V 2210/614* (2013.01)

(58) Field of Classification Search
CPC ........... G01V 1/28; G01V 1/282; G01V 1/48; G01V 2210/614

USPC ................................................ 367/33, 73, 13
See application file for complete search history.

(56) References Cited

U.S. PATENT DOCUMENTS 4,703,427 A * 10/1987 Catala et al. .................... 702/12
4,733,733 A * 3/1988 Bradley et al. ............. 340/853.4

(Continued)

FOREIGN PATENT DOCUMENTS

| GB | 2438050 A | 11/2007 |
|---|---|---|
| WO | 2009032595 A2 | 3/2009 |
| WO | 2009090494 A2 | 7/2009 |

OTHER PUBLICATIONS

Combined Search and Examination Report issued in GB1211344.5 on Jul. 27, 2012, 5 pages.

(Continued)

*Primary Examiner* — Isam Alsomiri
*Assistant Examiner* — Hovhannes Baghdasaryan
(74) *Attorney, Agent, or Firm* — Kimberly Ballew; Mark D. Shelley, II

(57) ABSTRACT

A surface seismic survey is generated or obtained from Earth's surface and is based on time in which acoustic waves are reflected to Earth's surface. One or more tools measure density and sonic velocity of a subsurface formation. An estimate of acoustic impedance is obtained from the density and the sonic velocity to generate a synthetic seismic survey. The synthetic seismic survey and the surface seismic survey are compared and/or correlated. The acoustic impedance can be iteratively estimated until the synthetic seismic survey matches the surface seismic survey. Matching the surface seismic survey with the synthetic seismic survey may ensure that the surface seismic survey may be calibrated in actual depth.

18 Claims, 6 Drawing Sheets

(56) References Cited

U.S. PATENT DOCUMENTS

| | | | |
|---|---|---|---|
| 4,940,943 | A | 7/1990 | Bartel et al. |
| 4,964,101 | A | 10/1990 | Liu et al. |
| 5,036,496 | A | 7/1991 | Rutledge |
| 5,233,567 | A * | 8/1993 | Calvert .................. 367/27 |
| 5,495,174 | A * | 2/1996 | Rao et al. ............... 324/339 |
| 5,741,962 | A | 4/1998 | Birchak et al. |
| 5,838,634 | A * | 11/1998 | Jones et al. ............. 367/73 |
| 6,304,086 | B1 | 10/2001 | Minerbo et al. |
| 6,641,434 | B2 | 11/2003 | Boyle et al. |
| 6,911,824 | B2 | 6/2005 | Bittar |
| 7,142,129 | B2 | 11/2006 | Hall et al. |
| 7,782,709 | B2 * | 8/2010 | Esmersoy ................ 367/31 |
| 2001/0024165 | A1 | 9/2001 | Steen, III et al. |
| 2001/0050559 | A1 | 12/2001 | Wisler et al. |
| 2002/0113592 | A1 | 8/2002 | Omeragic et al. |
| 2003/0184302 | A1 | 10/2003 | Omeragic et al. |
| 2004/0008578 | A1 * | 1/2004 | Leaney .................. 367/15 |
| 2004/0012392 | A1 | 1/2004 | McCormick |
| 2005/0122839 | A1 * | 6/2005 | DiFoggio et al. ......... 367/27 |
| 2005/0197777 | A1 | 9/2005 | Rodney et al. |
| 2005/0285753 | A1 | 12/2005 | Shah et al. |
| 2006/0066301 | A1 | 3/2006 | Radzinski |
| 2007/0156341 | A1 * | 7/2007 | Langlais et al. .......... 702/11 |
| 2007/0285274 | A1 * | 12/2007 | Esmersoy ............... 340/853.5 |
| 2008/0041626 | A1 | 2/2008 | Clark |
| 2008/0177475 | A1 | 7/2008 | McElhinney et al. |
| 2009/0084541 | A1 | 4/2009 | Braden |
| 2009/0243618 | A1 | 10/2009 | Wang et al. |

OTHER PUBLICATIONS

Examination Report issued in GB1101071.7 on Jan. 19, 2012, 2 pages.
Examination Report issued in GB1101835.5 on Feb. 24, 2012, 4 pages.
Examination Report issued in GB1211344.5 on Oct. 11, 2012, 2 pages.
Examination Report issued in GB1101071.7 on Sep. 7, 2012, 3 pages.
International Search Report and Written Opinion of PCT/US09/49941 dated Jan. 29, 2010.
International Search Report and Written Opinion of PCT/US09/50306 dated Mar. 9, 2010.
Examination Report issued in GB1101071.7 on Jan. 8, 2013, 1 page.
Examination Report issued in GB1101071.7 on Apr. 18, 2012, 1 page.
Office Action issued in MX/A/2011/000267 on Apr. 2, 2014 and MX agent's letter of May 21, 2014, 5 pages.

* cited by examiner

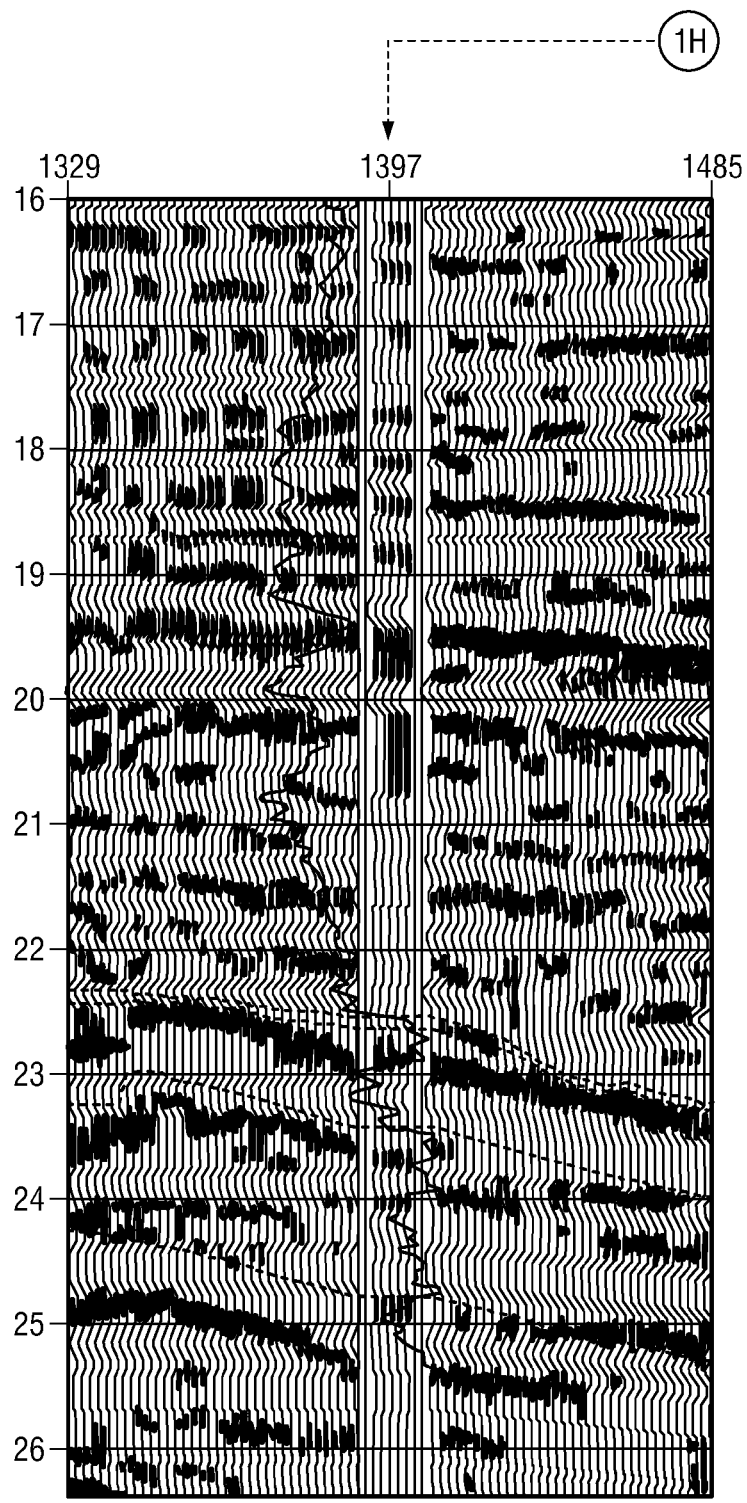
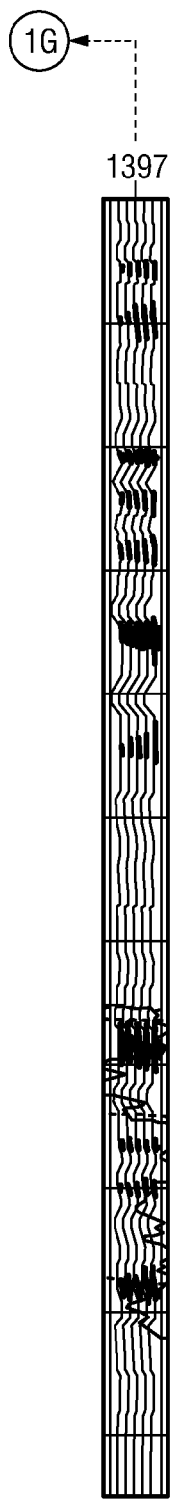
*FIG. 1G*
*FIG. 1H*

SYSTEM AND METHOD FOR GENERATING TRUE DEPTH SEISMIC SURVEYS

This application claims the benefit of U.S. Provisional Application Ser. No. 61/079,681 filed Jul. 10, 2008, entitled "Use of Induction Logging Tool and Wired Drill Pipe."

BACKGROUND OF THE INVENTION

To obtain hydrocarbons, a drilling tool is driven into the ground surface to create a wellbore through which the hydrocarbons are extracted. Typically, a drill string is suspended within the wellbore. The drill string has a drill bit at a lower end of the drill string. The drill string extends from the surface to the drill bit. The drill string has a bottom hole assembly (BHA) located proximate to the drill bit.

Measurements of drilling conditions, such as, for example, an inclination and an azimuth, a drift of the drill bit, fluid flow rates and fluid composition, may be necessary for adjustment of operating parameters, such as, for example, a trajectory of the wellbore, flow rates, wellbore pressures, production rates and the like. The BHA has tools that may generate and/or may obtain the measurements of the drilling conditions. For example, the BHA may acquire information regarding the wellbore and subsurface formations. Technology for transmitting information within a wellbore, known as telemetry technology, is used to transmit the information from the tools of the BHA to the surface for analysis. The information may be used to control the tools. Adjustment of the drilling operations in response to accurate real-time information regarding the tools, the wellbore, the formations and the drilling conditions may enable optimization of the drilling process to increase a rate of penetration of the drill bit, reduce a drilling time and/or optimize a placement of the wellbore.

High angle wells and horizontal wells increase retrieval of the hydrocarbons and improve recovery of the area in which the wellbore is located. To optimize the placement of these wells, the wellbore must be drilled into the target reservoir at the appropriate depth. Typically, information derived from a seismic survey is used to ensure that the wellbore is drilled in the target reservoir at the appropriate depth. In addition, the seismic survey may indicate properties of a region located beneath the drill bit to enable adjustment of the drilling operations, such as, for example, determination of a distance to drill before setting the next string of casing.

The seismic survey may be obtained by processing reflected seismic waves generated by subsurface seismic reflectors, such as, for example, the top and the bottom of the target reservoir. The reflected seismic waves are typically generated by a seismic acoustic source located at the surface, either on land, as generally shown in FIG. 1A, or offshore, as generally shown in FIG. 1B. When a seismic wave encounters a boundary between two materials having different impedances, a portion of the seismic wave is reflected and a portion of the seismic wave is transmitted through the boundary. Processing of the reflected seismic waves provides a graph indicating a surface seismic section of the area as a function of time as generally shown in FIG. 1C. However, the graph merely indicates the time the reflected acoustic waves were acquired and does not indicate a depth at which the reflected acoustic waves were reflected.

Before the well is drilled in the target reservoir, an accurate depth of the location of the subsurface reflectors associated with the target reservoir is unknown. Typically, the two-way travel time of acoustic waves measured at the surface during seismic survey acquisition and processing only enable association of a time with each of the subsurface seismic reflectors in the time domain. For example, a specific reflector may be associated with a time of 5 milliseconds. However, a great deal of uncertainty remains as to the true (or actual) depth of the target reservoir (or any other subsurface layer).

BRIEF DESCRIPTION OF THE DRAWINGS

FIG. 1G illustrates a surface seismic section in an embodiment of the present invention.

FIG. 1H illustrates the synthetic seismic shown in the middle of FIG. 1G in an embodiment of the present invention.

DETAILED DESCRIPTION OF THE PRESENTLY PREFERRED EMBODIMENTS

The invention is described with reference to figures that display embodiments of the invention. None of the drawings or description with reference to the figures is meant to limit the invention to these embodiments. The invention should be given its broadest interpretation and should only be limited by the claims.

Figure 1A:
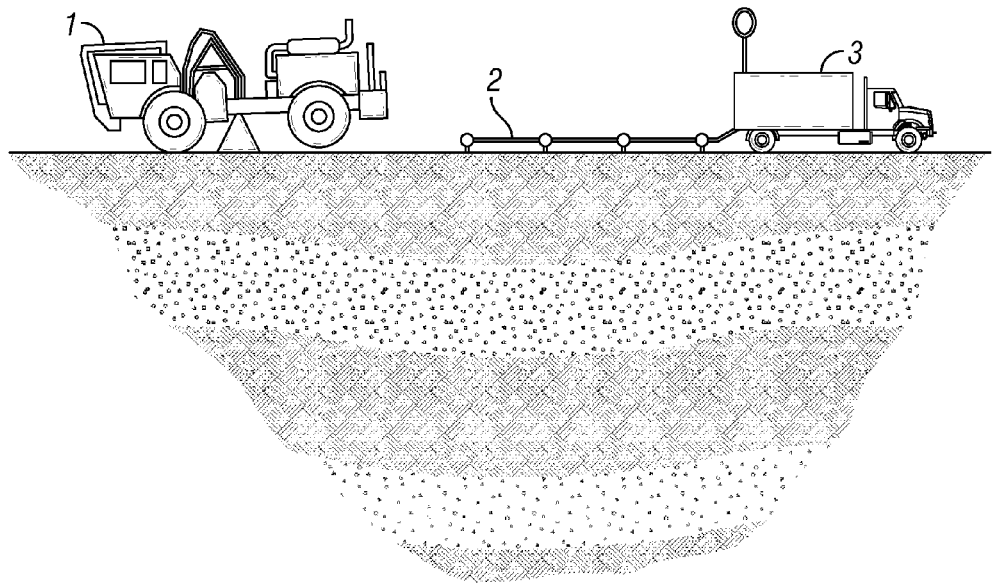
FIGS. 1A and 1B illustrate prior art seismic surveys.
Figure 1B:
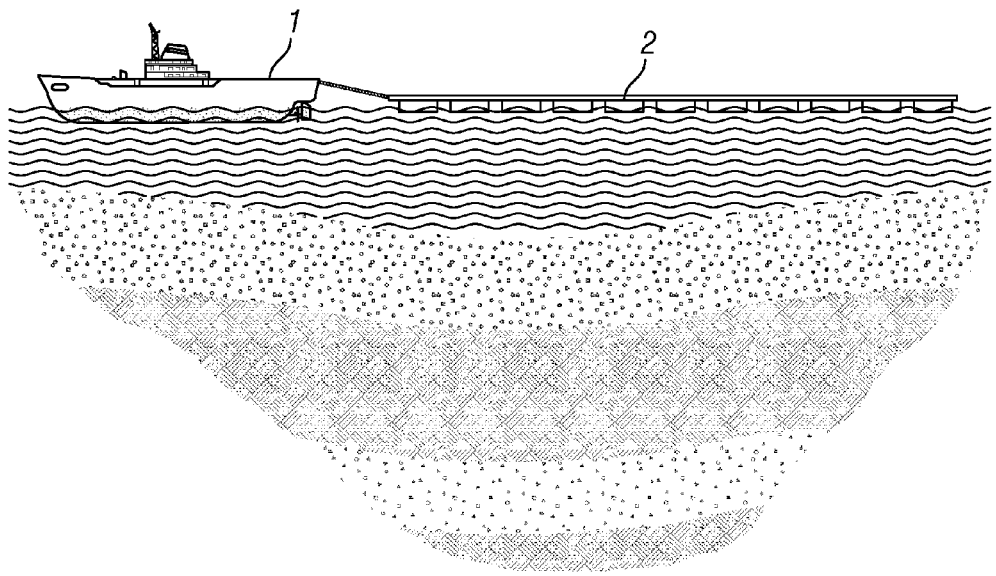
Figure 1C:
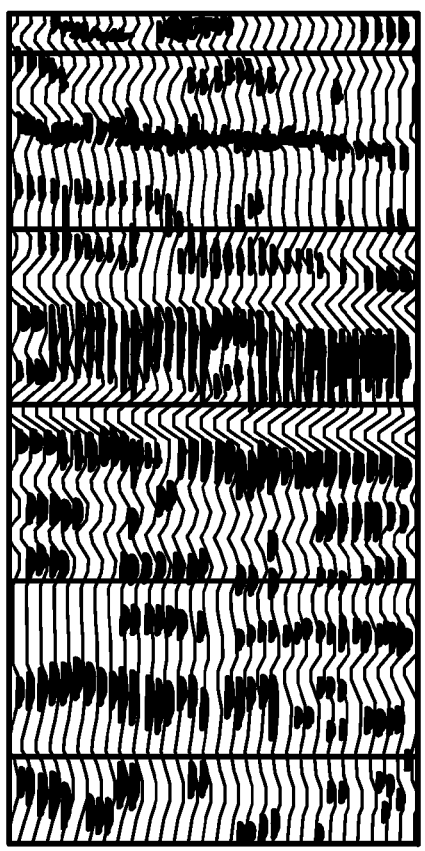
FIG. 1C illustrates a prior art surface seismic section as a function of time.
Figure 1D:
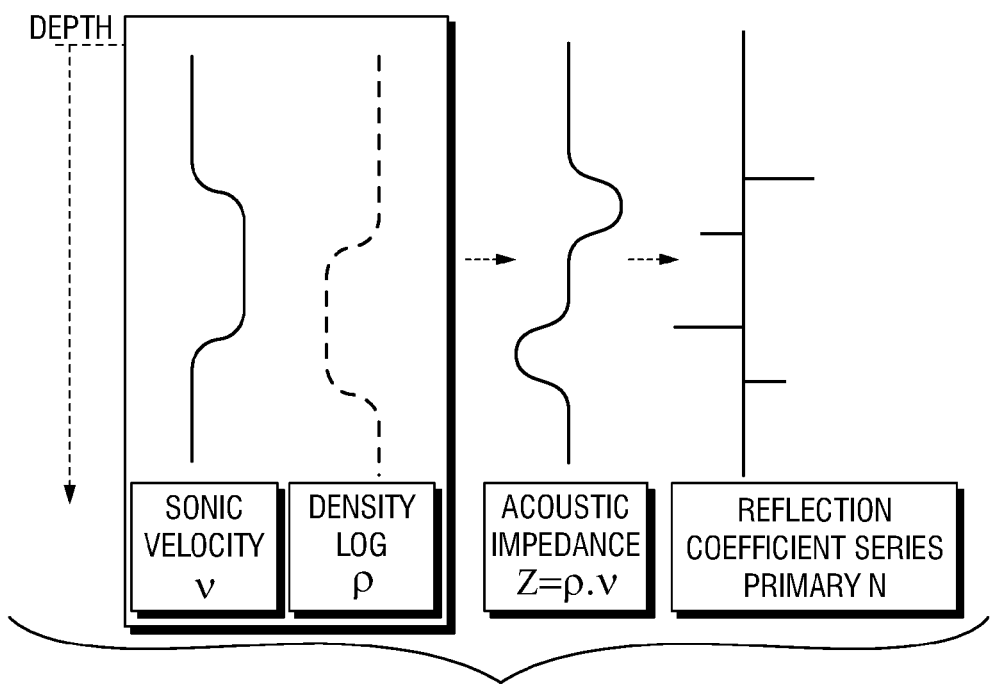
FIG. 1D illustrates a seismic survey in an embodiment of the present invention.
Figure 1E:
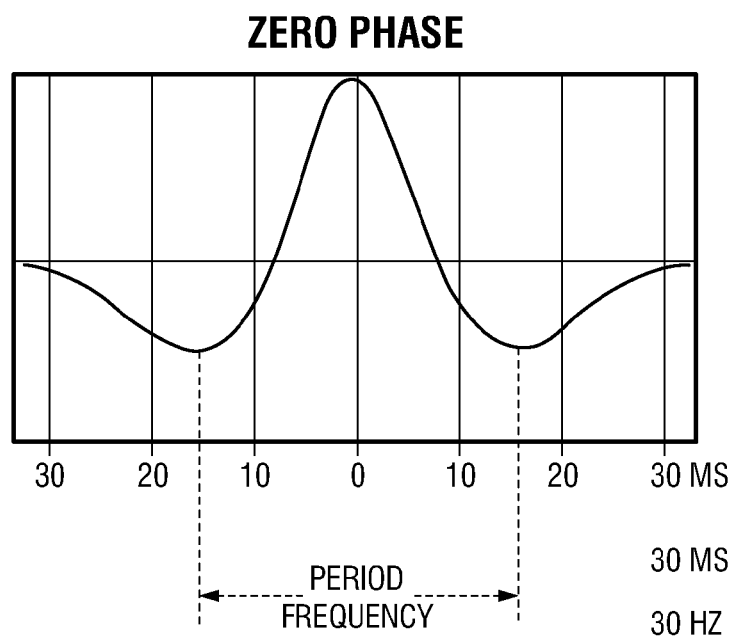
FIG. 1E illustrates a zero phase seismic wavelet in an embodiment of the present invention.
Figure 1F:
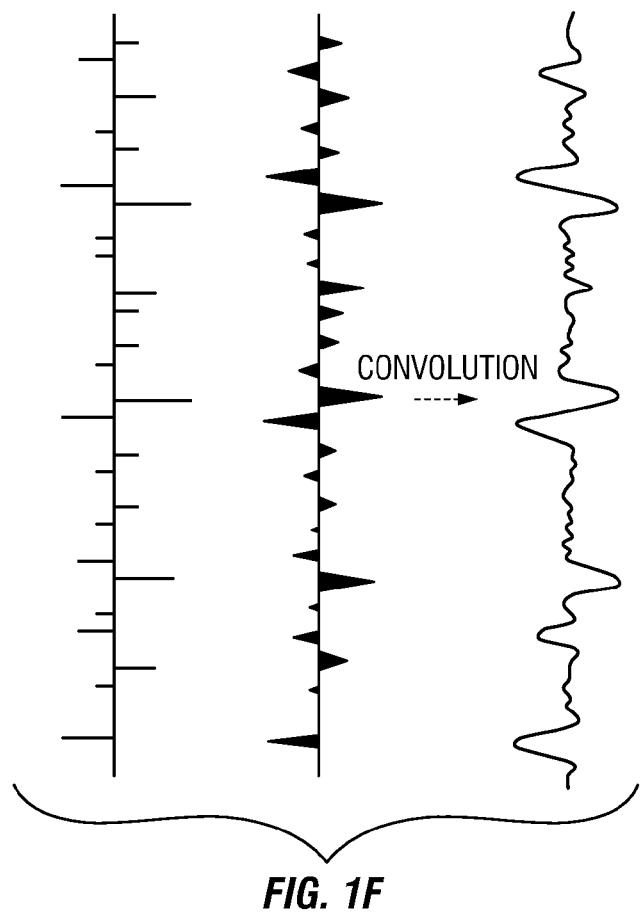
FIG. 1F illustrates a synthetic seismic trace in an embodiment of the present invention.
Figure 1I:
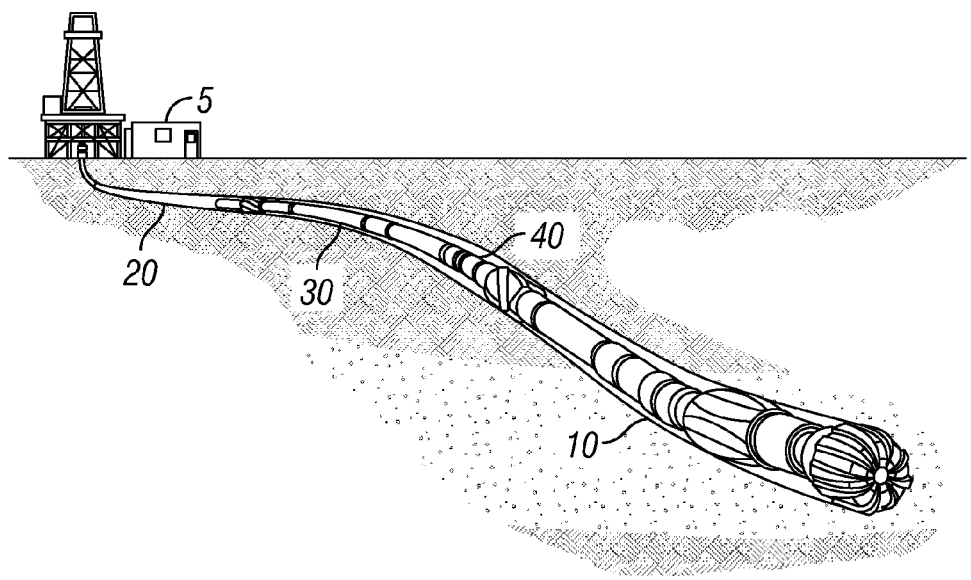
FIG. 1I illustrates a drill string in an embodiment of the present invention.

Referring to FIG. 1I, a drill string 20 is generally shown as extending into a subsurface formation. In an embodiment, the drill string 20 may comprise a portion of wired drill pipe having a communication channel within each drill pipe capable of transmitting data across pipe joints. An example of the wired drill pipe is described in U.S. Pat. No. 6,641,434 to Boyle et al. incorporated herein by reference in its entirety. The wired drill pipe may consist of one or more wired drill pipe joints that may be interconnected to form the drill string 20. The present invention is not limited to a specific embodiment of the wired drill pipe. In addition, in embodiments where the wired drill pipe is used to form the drill string 20, the wired drill pipe may comprise a portion of another telemetry system for transmitting data from downhole to the surface and another telemetry system may be used in another portion of the drill string 20. For example, wired drill pipe may be used for a portion of the drill string 20, such as a portion adjacent a bottom hole assembly 10 ("the BHA 10"), and mud pulse telemetry may be used from the wired drill pipe portion to the surface. Of course, this is applicable to other telemetry systems, such as electromagnetic telemetry, acoustic telemetry and other telemetry systems known to those having ordinary skill in the art. Furthermore, two or more types of telemetry systems may be used in parallel, whether simultaneously or as a backup in case of failure.

The BHA 10, a first tool 30 and a second tool 40 may be connected to the drill string 20. The BHA 10 may comprise one or more tools measuring characteristics of the wellbore, the formation around the wellbore, and/or the drill string 20. For example, the BHA 10 may comprise one or a plurality of known types of telemetry, survey or measurement tools, such as, logging-while-drilling tools (hereinafter "LWD tools"), measuring-while-drilling tools (hereinafter "MWD tools"), near-bit tools, on-bit tools, and/or wireline configurable tools.

The LWD tools may include capabilities for measuring, processing, and storing information, as well as for communicating with surface equipment. Additionally, the LWD tools may include one or more of the following types of logging devices that measure formation characteristics: a resistivity measuring device; a directional resistivity measuring device; a sonic measuring device; a nuclear measuring device; a nuclear magnetic resonance measuring device; a pressure measuring device; a seismic measuring device; an imaging device; a formation sampling device; a natural gamma ray device; a density and photoelectric index device; a neutron porosity device; and a borehole caliper device.

The MWD tools may include one or more devices for measuring characteristics of the drill string 20, providing or generating power, providing communication to or from the BHA 10, measuring characteristics of the wellbore or formation surrounding the wellbore, such as measuring a direction or inclination of the wellbore, and other measurements known to those having ordinary skill in the art. For example, the MWD tools may include one or more of the following types of measuring devices: a weight-on-bit measuring device; a torque measuring device; a vibration measuring device; a shock measuring device; a stick slip measuring device; a direction measuring device; an inclination measuring device; a natural gamma ray device; a directional survey device; a tool face device; a borehole pressure device; and a temperature device.

The wireline configurable tool may be a tool commonly conveyed by wireline cable as known to one having ordinary skill in the art. For example, the wireline configurable tool may be a logging tool for sampling or measuring characteristics of the formation, such as gamma radiation measurements, nuclear measurements, density measurements, and porosity measurements.

The first tool 30 and the second tool 40 may comprise any of the aforementioned tools, such as LWD, MWD, or wireline configurable tools. In an embodiment, the first tool 30 is capable of measuring the density of a formation around the wellbore, acoustic impedance of a formation, or compressional wave velocity of a formation. In an example, the first tool 30 may be an LWD Azimuthal Density Neutron ("ADN") tool 30 and the second tool 40 may be an LWD sonic acoustic tool 40, respectively. The first tool 30 and/or the second tool 40 may be in communication with the BHA 10 and/or the surface via the drill string 20, such as a wired drill string (e.g., a drill string having a portion of wired drill pipe, hereinafter "the wired drill string 20"). In an embodiment, the BHA 10 may include an AND tool and a sonic acoustic tool.

The first tool 30 may be spaced a predetermined distance from the BHA 10 and the second tool 40. The second tool 40 may be spaced a predetermined distance from the first tool 30 and the BHA 10. Advantageously, the wired drill string 20 permits the control of the first tool and the second tool 40 from the surface as well as communication from the first tool 30 and the second tool 40 to the surface.

The BHA 10, the first tool 30 and the second tool 40 may be in communication with a surface terminal 5 to transmit and receive data. The service terminal 5 may be, for example, a desktop computer, a laptop computer, a mobile cellular telephone, a personal digital assistant ("PDA"), a 4G mobile device, a 3G mobile device, a 2.5G mobile device, an internet protocol (hereinafter "IP") video cellular telephone, an ALL-IP electronic device, a satellite radio receiver and/or the like. The surface terminal 5 may be located at a surface location and/or may be remote relative to the borehole. The present invention is not limited to a specific embodiment of the surface terminal 5, and the surface terminal 5 may be any device that has a capability to communicate with the BHA 10 using the wired drill string 20. Any number of surface terminals may be connected to the wired drill string 20, and the present invention is not limited to a specific number of surface terminals.

The surface terminal 5 may store, process and analyze the data transmitted by the drill string 20. The surface terminal 5 may also generate and transmit control messages to the BHA 10, the first tool 30, the second tool 40 and/or other downhole tools. For example, the surface terminal 5 may automatically generate the control messages based on the data transmitted by the drill string 20. As a further example, the surface terminal 5 may provide the data to an operator that may consider the data and may transmit the control messages based on user input.

The surface terminal 5 may store, may access or may obtain a surface seismic survey of the subsurface formations around the wellbore. The seismic survey may be obtained by processing reflected seismic waves generated by subsurface seismic reflectors, such as, for example, the top and the bottom of the target reservoir. The reflected seismic waves are typically generated by a seismic acoustic source located at the surface, either on land, as generally shown in FIG. 1A, or offshore, as generally shown in FIG. 1B. When a seismic wave encounters a boundary between two materials having different impedances, a portion of the seismic wave is reflected and a portion of the seismic wave is transmitted through the boundary. Processing of the reflected seismic waves provides a graph indicating a surface seismic section of the area as a function of time as generally shown in FIG. 1C. However, the graph merely indicates the time the reflected acoustic waves were acquired and does not indicate a depth at which the reflected acoustic waves were reflected.

FIG. 1D generally illustrates that a reflection of an acoustic wave may occur if there is a significant change of the product of density A and velocity V at the boundary between two adjacent subsurface layers of a formation. The product of density A and velocity V is known to one having ordinary skill in the art as acoustic impedance.

Simulated seismic trace tr(t), known as "synthetic seismic" to one having ordinary skill in the art, may be obtained by convolving in the time domain the signature of the surface source with the series of subsurface reflections. The synthetic seismic for a single subsurface seismic reflector may be characterized by a reflectivity R defined by the equation tr(t)=S(t) X R(z). In the equation, t is the time, tr(t) is the seismic trace acquired at the surface and S(t) is the zero phase seismic wavelet representing the time signature of the seismic source located in the wellbore, such as the first tool 30, the second tool 40 and/or the BHA 10. R(z) is the reflectivity defined by the equation $R(z)=(\Delta_2 V_2 - \Delta_1 V_1)/(\Delta_2 V_2 + \Delta_1 V_1)$ where z is the depth of the subsurface seismic reflector located at the boundary between a first subsurface formation layer and a second subsurface formation layer.

The first tool 30, the second tool 40, and/or the BHA 10 may measure the density Δ and the velocity V of one of the subsurface layers. The density Δ, the sonic velocity V, and/or an estimated acoustic impedance may be transmitted to the surface terminal 5. An initial estimate of the acoustic impedance of the subsurface formation layer may be derived from the density measurement and/or the sonic velocity measurement provided by the BHA 10, the first tool 30, the second tool 40 or other tool in communication with the drill string 20.

The zero phase seismic wavelet S(t), such as, for example, the zero phase seismic wavelet S(t) shown in FIG. 1E, may represent the time signature of the seismic source. The zero phase seismic wavelet S(t) may be used to generate the synthetic seismic trace (or synthetic seismic survey) shown in FIG. 1F.

The synthetic seismic survey may be compared with the surface seismic survey to correlate specific subsurface seismic reflectors. The above-described process may calibrate the surface (time) seismic survey with the depths of the subsurface seismic reflectors. If the synthetic seismic survey does not match the surface seismic survey, the estimated acoustic impedance may be iteratively changed until the synthetic survey matches, at least within a predetermined threshold, the surface seismic survey. For example, the acoustic impedance may be adjusted until a best match between the surface seismic survey in the corresponding region with the synthetic seismic is achieved. Matching the surface seismic survey with the synthetic seismic survey may ensure that the surface seismic survey may be calibrated in actual depth. In addition, matching the surface seismic survey with the synthetic seismic may increase accuracy of the estimate of the acoustic impedance of each traversed subsurface formation layer.

If the acoustic impedance that may be determined using the density measurements and/or the sonic velocity measurements is accurate, the surface seismic survey for the corresponding region may match the synthetic seismic that may be calculated using the previously described equation $R(z)=(\Delta_2 V_2-\Delta_1 V_1)/(\Delta_2 V_2+\Delta_1 V_1)$. The density $\Delta$ and/or the acoustic velocity V may be obtained from the BHA 10, the first tool 30 and/or the second tool 40. For example, referring again to FIG. 1I, the density measurements and/or the sonic velocity measurements may be provided by a tool, such as a tool in the BHA 10, the first tool 30 and/or the second tool 40.

Figure 1J:
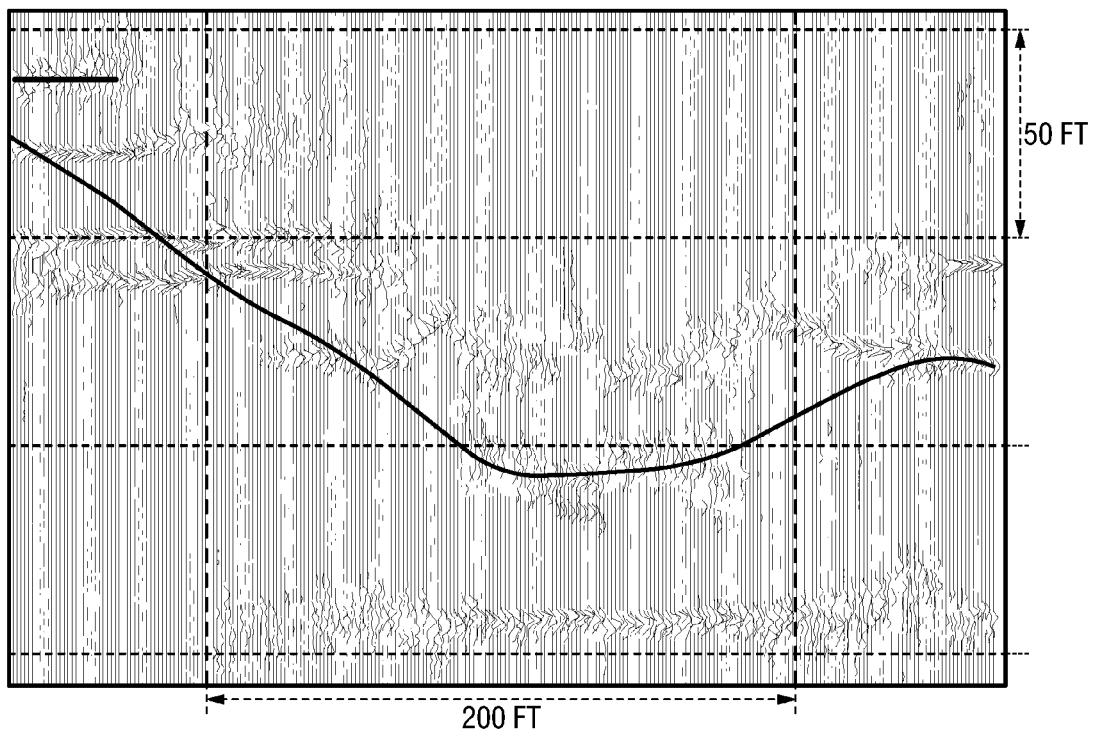
FIG. 1J illustrates a graph estimating depths of the subsurface seismic reflectors in an embodiment of the present invention.
Figure 1K:
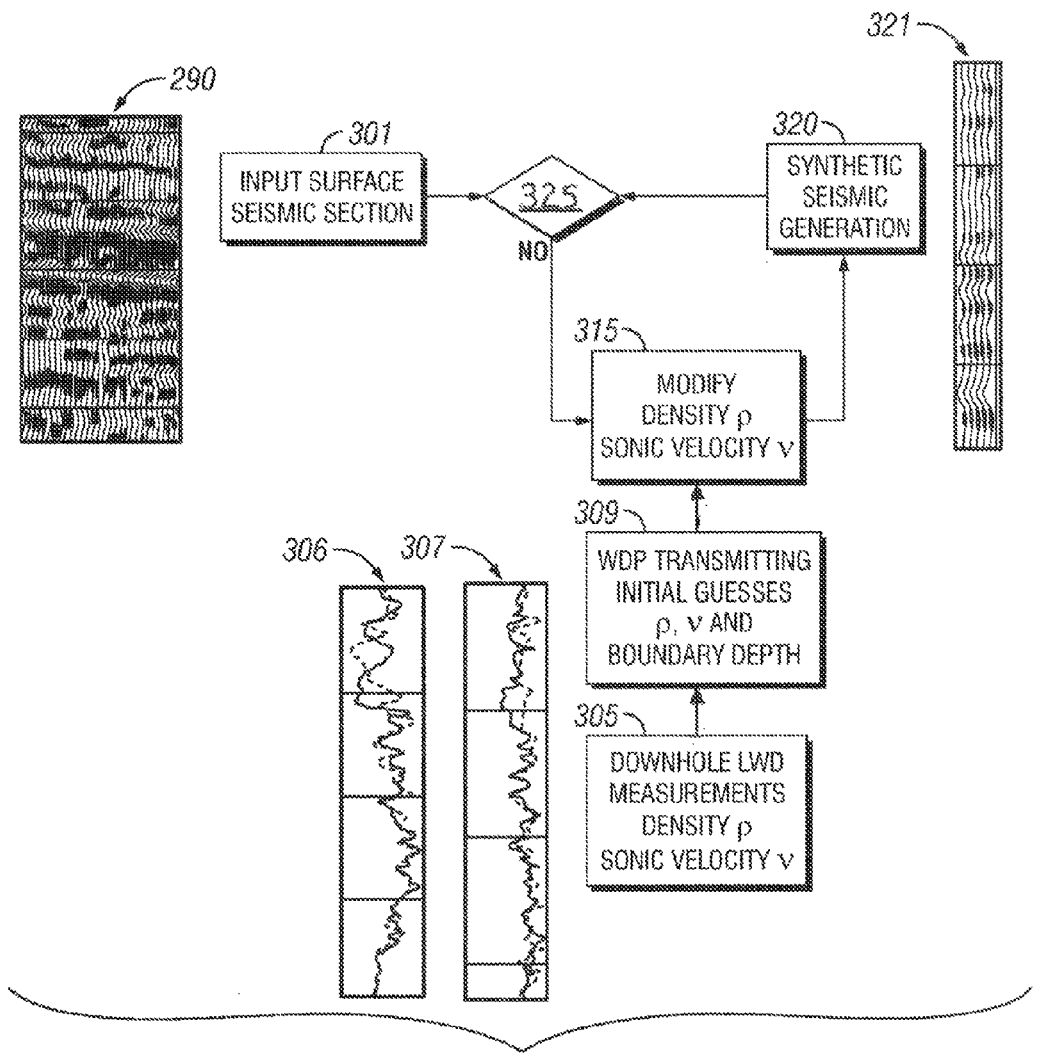
FIG. 1K illustrates a flowchart of a method for managing and/or using drilling data in an embodiment of the present invention.
Figure 1L:
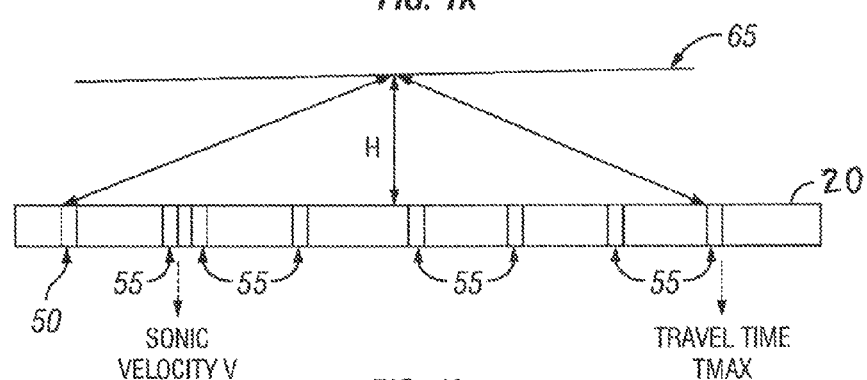
FIG. 1L illustrates a black box diagram of a sonic acoustic tool in an embodiment of the present invention.

As generally shown in FIG. 1L, the first tool 30 and/or the second tool 40 may have a series of acoustic receiver modules 50 (hereinafter "receiver modules 50") and/or at least one acoustic transmitter module 55 (hereinafter "transmitter module 55"). The receiver modules 50 and/or the transmitter module 55 may have an antenna as discussed in more detail hereafter.

One of the receiver modules 50 may be located a relatively small distance from the transmitter module 55 and/or may be used to estimate the sonic velocity of a region located adjacent to the wellbore. A reflected seismic wave reflected by the interface of the gas-oil contact (GOC) may be detected by one of the receiver modules 50 located at a relatively large distance from the transmitter module 55. The sonic velocity and/or the two-way travel time of the seismic wave reflected by the GOC may be used to estimate the location of a subsurface acoustic reflector 65 located in the GOC using the equations $2x=T_{max}V$, $H=\sqrt{(x^2-(L^2/4))}$ and $z_{reflector}=z_{tool}-H$ where V is the sonic velocity, T. is the maximum two-way travel time, $z_{tool}$ is the depth of the tool and $z_{reflcectors}$ is the depth of the reflector. Thus, the synthetic seismic survey may be calculated as previously described by using additional subsurface acoustic reflectors. To increase the depth of investigation, the density measurements of the second tool 40 may be supplemented by a differential tri-axial gravity measurement made at two different depths. For example, an estimate of density may be estimated using the gravity component measured along the wellbore trajectory. The depth of investigation of the gravity component may be directly proportional to the distance between the two different depths.

FIG. 1K generally illustrates a flowchart of a method 300 for adjusting the acoustic impedance during drilling of the wellbore in an embodiment of the present invention. As generally shown at step 301, the surface seismic survey 290 may be generated. For example, the surface seismic survey 290 may be generated by the surface terminal 5. As generally shown at step 305, the density measurements and/or the sonic velocity measurements may be obtained. For example, the density measurements and/or the sonic velocity measurements may be provided by the first tool 30, the second tool 40, a tool in the BHA 10, and/or another downhole tool. The first tool 30 and/or the second tool 40 may generate a density log 306 and/or a sonic compressional log 307, respectively.

As generally shown at step 309, the surface terminal 5 may calculate and/or the wired drill pipe 20 may transmit an estimate of the acoustic impedance based on the density measurements and/or the sonic velocity measurements. An initial estimate of the acoustic impedance of each subsurface formation layer may be derived from the density measurements and/or the sonic velocity measurements provided by the BHA 10, the first tool 30, the second tool 40 or other tool in communication with the drill string 20. As generally shown at step 315, the estimated acoustic impedance may be iteratively modified. For example, the surface computer 5 and/or a downhole processor may modify the estimated acoustic impedance using an iterative process. As generally shown at step 320, the synthetic seismic survey may be generated as generally shown at step 321. For example, the surface computer 5 and/or a downhole processor may generate the synthetic seismic survey 321.

As generally shown at step 325, the synthetic seismic survey 321 may be compared to the surface seismic survey 290. For example, the surface computer 5 and/or a downhole processor may compare the synthetic seismic survey 321 to the surface seismic survey 290. If the synthetic seismic survey 321 matches the surface seismic survey 290, such as, for example, then the synthetic seismic survey 321 and the surface seismic survey 290 are within threshold values of variation. If the synthetic seismic survey 321 does not match the surface seismic survey 290, such as, for example, if the synthetic seismic survey 321 and the surface seismic survey 290 are not within threshold values of variation, an estimate of the acoustic impedance may be modified again at step 315. Steps 315, 320 and 325 may be repeated until the synthetic seismic 321 matches the surface seismic section 290.

The estimate of the acoustic impedance and/or the synthetic seismic survey may refine processing of the original seismic section. Further, the estimate of the acoustic impedance and/or the synthetic seismic survey may be used to estimate the density of a location several feet from the wellbore, which may be a greater distance relative to the typical density measurement which has a depth of investigation of several inches from the wellbore. Moreover, the estimate of the acoustic impedance and/or the synthetic seismic survey may provide an estimate of the average compressional or sonic velocity, density and/or acoustic impedance of a subsurface formation layer at a location ten feet or more from the wellbore, which may be a greater distance relative to the typical LWD sonic velocity measurement that may have a limited depth of investigation, such as one or two feet from the wellbore. Thus, the wired drill pipe 20 may enable real-time transmission of the information needed to determine the depths of the boundaries, to determine the initial estimate of the acoustic impedance for each subsurface formation layer, to generate the synthetic seismic survey and to iteratively correlate the synthetic seismic survey with the surface seismic survey to determine the depths of the reflectors, and/or to provide an estimate of the acoustic impedance of each traversed subsurface rock layer to refine the processing of the surface seismic section.

FIG. 1G depicts an example of the surface seismic survey with the synthetic seismic survey shown versus time in the middle of the surface seismic section. The synthetic seismic survey shown in FIG. 1G may be depicted separately as shown in FIG. 1H. Correlating the synthetic seismic survey to the surface seismic survey may provide a seismic survey that is more accurate than prior art systems that use a density log and a sonic compressional log to correlate the seismic survey. The prior art systems assume that both of the logs respond to the variations in acoustic impedance. In addition, the prior art systems assume that the logs capture changes associated with the presence of a subsurface seismic reflector extending laterally beyond the depth of investigation of the density and sonic velocity measurements to be observed on the seismic survey.

Moreover, having an updated seismic survey with actual depths enables determination of the depths of boundaries separating adjacent subsurface formation layers. A structural model, known to one having ordinary skill in the art as a "layer cake model," may be defined using the depths of the boundaries.

The wired drill string 20 may be used to optimize the determination of the depths of the boundaries by controlling configuration or operation of the first tool 30, the second tool 40, and/or the BHA 10. Spacing and/or frequencies of the tools may be controlled to obtain optimum detection of the depths of the boundaries. The depths of the subsurface seismic reflectors may be estimated as generally shown in FIG. 1J.

It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

The invention claimed is:

1. A method comprising:
   obtaining a surface seismic survey of a subsurface formation by processing reflected acoustic waves generated by one or more subsurface seismic reflectors, each subsurface seismic reflector having a depth;
   obtaining a density measurement and a sonic velocity measurement of a subsurface layer using one or more tools connected to a wired drill string positioned within a wellbore wherein said tools are selected from the group consisting of LWD tools, MWD tools, near-bit tools, on-bit tools and wireline configurable tools;
   estimating an acoustic impedance of the subsurface layer based on the density measurement and the sonic velocity measurement provided by the one or more tools;
   generating a synthetic seismic survey derived from the acoustic impedance;
   comparing the synthetic seismic survey to the surface seismic survey wherein the acoustic impedance is iteratively changed until the synthetic seismic survey matches the surface seismic survey within a predetermined threshold and the surface seismic survey is calibrated in actual depth using the synthetic seismic survey that matches the surface seismic survey and the depth of the one or more subsurface seismic reflectors; and
   adjusting a wellbore operation or an operating parameter based on the calibrated surface seismic survey.

2. The method of claim 1, wherein one or more tools comprises a plurality of acoustic receiver modules or at least one acoustic transmitter module.

3. The method of claim 1, wherein the one or more tools comprises a plurality of acoustic receiver modules and at least one acoustic transmitter module.

4. The method of claim 1, wherein the step of obtaining a density measurement and a sonic velocity measurement of a subsurface layer further comprises obtaining a density measurement and a sonic velocity measurement for each of a plurality of subsurface layers.

5. The method of claim 1, wherein the one or more tools comprises a first tool spaced at a predetermined distance from a bottom hole assembly, wherein the bottom hole assembly comprises at least one tool.

6. The method of claim 5, wherein the one or more tools further comprises a second tool spaced at a predetermined distance from the first tool and the bottom hole assembly.

7. The method of claim 5, wherein the first tool comprises a plurality of acoustic receiver modules or at least one acoustic transmitter module.

8. The method of claim 6, wherein each of the first tool and the second tool comprises a plurality of acoustic receiver modules or at least one acoustic transmitter module.

9. The method of claim 1, wherein the density measurement and the velocity measurement are transmitted to Earth's surface via the drill string.

10. The method of claim 1, wherein at least a portion of the drill string comprises wired drill pipe to provide communication from the one or more tools to the Earth's surface.

11. The method of claim 1, further comprising the step of positioning a wired drill string in the well bore to provide communication to the Earth's surface wherein the density measurement and the sonic velocity measurement are transmitted to the Earth's surface via the wired drill string.

12. A system comprising:
    a drill string positioned within a wellbore, the drill string comprising a plurality of wired drill pipes communicatively coupled and extending into a subsurface formation having a plurality of layers;
    one or more tools in communication with the drill string measuring a density and a sonic velocity of at least one of the plurality of layers wherein said tools are selected from the group consisting of LWD tools, MWD tools, near-bit tools, on-bit tools and wireline configurable tools;
    a seismic acoustic source producing time acoustic waves; and
    a terminal in communication with the one or more tools via the drill string, the terminal having access to a surface seismic survey of the subsurface formation generated from positioning an acoustic source at Earth's surface and measuring time acoustic waves are reflected to the Earth's surface, wherein the terminal is configured to estimate acoustic impedance based on the density and the sonic velocity of the at least one of the plurality of layers, generate a synthetic seismic survey based on the estimated acoustic impedance wherein the synthetic seismic survey is characterized for one or more subsurface seismic reflectors, each of the subsurface seismic reflectors having a depth located at a boundary between a first subsurface formation layer and a second surface formation layer, compare the synthetic seismic survey to the surface seismic survey, iteratively change the acoustic impedance to modify the synthetic seismic survey until the synthetic seismic survey matches the surface seismic survey within a predetermined threshold of variation, and calibrate the surface seismic survey in actual depth using the synthetic seismic survey that matches the surface seismic survey and the depth of the one or more subsurface seismic reflectors.

13. The system of claim 12, wherein each of the one or more tools comprises a plurality of acoustic receiver modules or at least one acoustic transmitter module.

14. The system of claim 13, wherein the one or more tools comprises a plurality of tools, wherein each of the plurality of tools is at a different depth within the wellbore.

15. The system of claim 12, wherein the terminal is configured to receive the density and the sonic velocity measurements via the drill string.

16. The system of claim 12, wherein the terminal is configured to receive the depth of at least one of the plurality of layers from one of the tools in communication with the drill string.

17. The system of claim 16, wherein the one or more tools comprises a first tool spaced at a predetermined distance from a bottom hole assembly, wherein the bottom hole assembly comprises at least one tool.

18. The system of claim 12, wherein the terminal is configured to obtain the depth of the at least one of the plurality of layers and transforms the surface seismic survey based on the depth.

* * * * *